United States Patent [19]

Horiuchi

[11] Patent Number: 4,854,684
[45] Date of Patent: Aug. 8, 1989

[54] COMPACT ZOOM LENS
[75] Inventor: Akihisa Horiuchi, Tokyo, Japan
[73] Assignee: Canon Kabushiki Kaisha, Tokyo, Japan
[21] Appl. No.: 63,434
[22] Filed: Jun. 18, 1987
[30] Foreign Application Priority Data Jun. 27, 1986 [JP] Japan ................................. 61-151225
Jun. 27, 1986 [JP] Japan ................................. 61-151226

[51] Int. Cl.$^4$ ........................................... G02B 15/16
[52] U.S. Cl. ..................................... 350/427; 350/423
[58] Field of Search ....................... 350/427, 423, 450
[56] References Cited

U.S. PATENT DOCUMENTS 3,477,776 11/1969 Price ................................... 350/427
4,299,454 11/1981 Betensky ............................ 350/427
4,451,124 5/1984 Basista et al. ..................... 350/427

FOREIGN PATENT DOCUMENTS 58-202417 11/1983 Japan ................................. 350/427
1441119 6/1976 United Kingdom ................ 350/427

Primary Examiner—Bruce Y. Arnold
Assistant Examiner—Terry S. Callahan
Attorney, Agent, or Firm—Fitzpatrick, Cella, Harper & Scinto

[57] ABSTRACT

A compact zoom lens comprises, from front to rear, a first lens unit for focusing having a positive refractive power, a second lens unit having a negative refractive power and axially movable for varying the image magnification, a third lens unit axially movable for compensating for the shift of an image plane resulting from the variation of the image magnification, and a fourth lens unit of positive refractive power having an image forming function which remains stationary relative to a focal plane. The fourth lens unit includes, from front to rear, a first lens of positive refractive power, a second lens of negative refractive power, a third lens of negative refractive power, a fourth lens of positive refractive power and a fifth lens of positive refractive power. And, in particular, a stop for determining the F-number is arranged in a space between the second and third lens units.

9 Claims, 4 Drawing Sheets

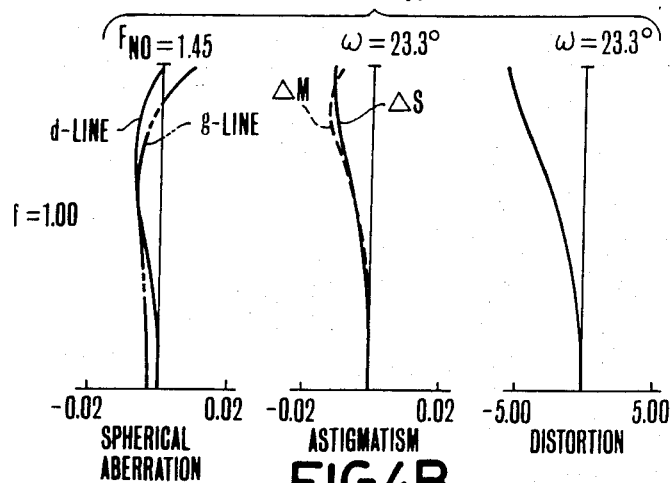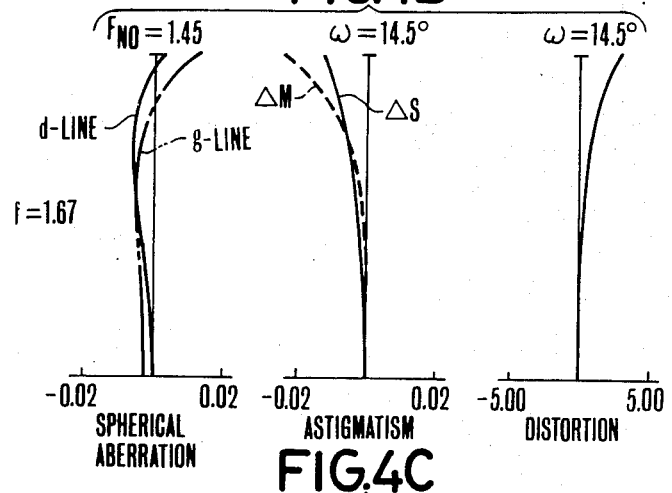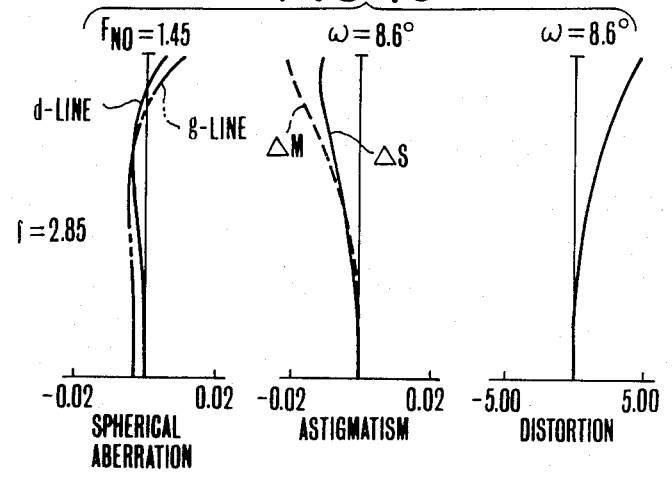

COMPACT ZOOM LENS

BACKGROUND OF THE INVENTION

1. Field of the Invention

This invention relates to zoom lenses, and more particularly to zoom lenses of high optical performance suited for use in photographic cameras or video cameras.

2. Description of the Related Art

For objective lenses of the photographic cameras and video cameras, a better compromise of increasing speed and of minimizing the bulk and size has been sought. Particularly in the video camera, because the image pickup element has a relatively low sensitivity, it has been required that the speed be faster than 1:1.4 in F-number. Besides this, to allow for unification of the video camera with the video recorder in compact form, the requirement for reducing the size and weight of the objective lens should be fulfilled. It has further been required that the objective lens be of zoom type with high optical performance, and the image pickup element such as tube or CCD be preceded by a space of axial length long enough to arrange the protection glass plate and the various filters such as stripe filter for color separation and low pass filter therein, in other words, the back focal distance be sufficiently long.

To design an objective lens for adaptation to the video camera with the provision of such various features, it becomes difficult to preserve good optical performance. Particular difficulty is found in well correcting spherical aberration, coma and distortion. As a result, good contrast of image has to be sacrificed.

Also, what has generally been used in zoom lenses is the type shown in FIG. 1. The zoom lens of FIG. 1 comprises, from front to rear, a first lens unit 21 of positive power for focusing a second lens unit 22 of negative power monotonously movable for varying the image magnification, a third lens unit 23 of positive power whose reciprocating motion when expanded takes a convex locus toward the rear to compensate for the image shift which accompanies with the variation of the image magnification, and a fourth lens unit 24 of positive power having a function of forming an image. And, a diaphragm 25 is arranged in between the third and fourth lens units 23 and 24. However, because the space the diaphragm 25 occupies and the space in which the magnification varying lens unit moves do not overlap each other, the total length of the entire lens system tended to increase. Also, because the distance between the diaphragm and the first lens unit is very long, the diameter of the first lens unit, which is determined by the off-axial oblique pencil at or near the wide angle end of zooming range, tended to increase.

As the document of the related art, mention may be made of U.S. patent application Ser. Nos. 877,101 filed June 23, 1986 now U.S. Pat. No. 4,763,998 and 931,537 filed Nov. 14, 1986 assigned to the assignee of the present invention, in which the diaphragm is arranged in a space between the lens units movable for zooming. The zoom lens of Ser. No. 391,537 has a tendency of giving larger F-numbers when in the telephoto positions than when in the wide angle positions.

SUMMARY OF THE INVENTION

A first object of the invention is to provide a zoom lens of reduced F-number while still permitting good correction of aberrations to be achieved.

A second object is to provide a high range compact zoom lens of which the total length and the diameter of the first lens unit are shortened at once to achieve a minimization of the weight of the entire lens system.

BRIEF DESCRIPTION OF THE DRAWINGS

FIGS. 3A to 5C are graphic representations of the various aberrations of specific embodiments 1 to 3 of the invention. In these graphs, the aberrations in the wide angle, middle and telephoto positions with an object at infinity are illustrated respectively by FIGS. 3A, 4A and 5A, FIGS. 3B, 4B and 5B, and FIGS. 3C, 4C and 5C. In FIG. 2, the arrow indicates the direction of movement of the lens units movable for zooming. In FIGS. 3A to 5C, d represents the spectral d-line, g the spectral g-line, AS the sagittal image surface, ΔM is the meridional image surface, and I, II, III and IV respectively the first, second, third and fourth lens units.

DETAILED DESCRIPTION OF THE PREFERRED EMBODIMENT

Figure 2:
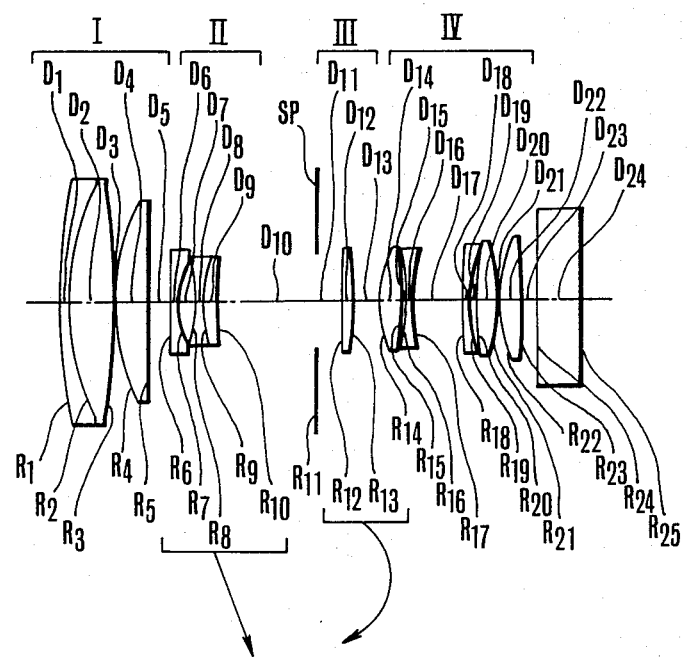
FIG. 2 is a longitudinal section view of the optical system of a zoom lens according to the present invention.

FIG. 2 in block diagram illustrates the optical system of the zoom lens according to the invention comprising, from front to rear, a first lens unit I of positive power for focusing, a second lens unit II of negative power which moves in one direction, say rearward, over the entire zooming range to vary the image magnification, as zooming from the wide angle to the telephoto end, a third lens unit III of positive power which moves axially in a locus of rearward convexity to maintain constant the position of the image plane as it is shifted with variation of the image magnification, and a fourth lens unit IV of positive power having the function of forming an image which remains stationary during zooming. A stop SP is positioned in a space between the second and third lens units II and III to be stationary relative to the image plane.

In most of the commonly available zoom lenses, the first lens unit accounts for 5 to 8 tenths of the weight of the entire lens system. For this reason, to achieve a reduction of the weight of the zoom lens, it appears that there are two effective methods, one of which is to decrease the specific gravity of the material of the lens elements of the first lens unit, and the other of which is to contract the volume of the first lens unit by shortening its diameter. Of these, the selection of materials of a lighter specific gravity leads to lower the degree of freedom on the optical design. Hence, a difficult alternative problem will arise. From this reason, in order to achieve a valuable reduction of the weight in such a way that good imaging performance is preserved, it is advantageous at decreasing the diameter of the front members of the first lens unit. On assumption that when to contract the lens volume, its longitudinal and lateral lengths change at the same rate, it is proportional to the third power of the lens diameter. Hence, if the lens diameter can be decreased, for example, 10%, it is found from $(0.9)^3$ that the reduction of the volume amounts up to as large as about 27%.

Figure 1:
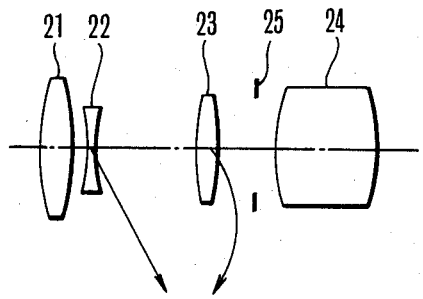
FIG. 1 is a block diagram of the optical system of the conventional zoom lens.

At first, explanation concerning the diameters of the front lens units is made. This relates to numerical examples of an embodiment 1, 2 and 3. In the general embodiment of the invention, priority is given particularly to shortening of the diameter of the first lens unit. Thus, a valuable reduction of the weight of the entire lens system is achieved. For this purpose, whilst the prior known zoom lens of FIG. 1 has the stop in rear of the third lens unit, the stop is brought frontward into the space between the second and third lens units II and III so that its position is nearly coincident with the center of the physical length of the optical system. And, in this embodiment, the arrangement of the stop and the lens units is so controlled that the value the diameter of the first lens unit takes when in the wide angle end as is determined by the oblique pencil and the value it takes when in the telephoto end as is determined by the on-axial pencil are both minimized. Further, a valuable increase of the maximum image angle is achieved in such a way that, despite the angle of the oblique pencil with the optical axis is increased, the effective diameter of the front lens units is prevented from extending to an appreciable degree, and, the on-axial pencil in the telephoto end is made contributable to determining of that diameter so that the value of the diameter can be determined depending on the given value of F-number in the telephoto end. This produces an advantage that the longitudinal and lateral lengths of the entire lens system can be adjusted in good balance.

In a specific embodiment of the invention, to minimize the diameter of the front lens units, it is preferred to satisfy the following conditions:

$$3.1 < f_1/fw < 4.19 \quad (1)$$

$$-1.24 < f_2/fw < -0.97 \quad (2)$$

where $f_1$ and $f_2$ are the focal lengths of the first and second lens units, and fw is the shortest focal length of the entire system.

And, by satisfying the inequalities of condition (1) along with the inequalities of condition (2), the separations between the first and second lens units are shortened to bring the first lens unit into as close a position to the stop as possible. Thus, a further reduction of the diameter of the front lens units is achieved.

When the refractive power of the first lens unit weakens beyond the upper limit of the inequalities of condition (1), the convergence of the light beam becomes insufficient with the result of increasing the diameter of the front lens units. When it becomes too strong beyond the lower limit, the first and second lens units approach each other so closely that they mechanically interfere with each other.

When the refractive power of the second lens unit becomes too strong beyond the upper limit of the inequalities of condition (2), variation of aberrations increases, thereby it being made more difficult to attain a good stability of optical performance throughout the entire zooming range. When it becomes too weak beyond the lower limit, though the aberrations little change, the total movement of the second lens unit must be increased to obtain the prescribed zoom ratio. Thus, the total length of the lens is increased objectionably.

In the foregoing specific embodiment, to achieve a further improvement of the stability of aberration correction over the entire zooming range, the following conditions are set forth:

$$6.37 < R_{I1}/fw < 8 \quad (3)$$

$$1.06 < R_{II2}/fw < 1.36 \quad (4)$$

$$0.23 < D_{II2}/fw < 0.3 \quad (5)$$

where $R_{Ii}$ is the radius of curvature of the i-th lens surface counting from front of the first lens unit I, and $R_{IIi}$ and $D_{IIi}$ are respectively the radius of curvature of the i-th lens surface and the i-th axial thickness or air separation counting from front of the second lens unit II.

The inequalities of condition (3) give a range of refractive powers of the first lens surface of the first unit I. When this condition is satisfied, mainly distortion is well corrected. If the refractive power becomes too weak beyond the upper limit, the amount of negative distortion produced will increase on the wide angle side. If the refractive power becomes too strong beyond the lower limit, the amount of positive distortion produced will increase on the telephoto side. In either case, good correction of this becomes more difficult to achieve.

The inequalities of condition (4) and (5) give a range of refractive power of the second lens surface of the second unit II and a range of air separation between the first and second lens elements of the second unit II. When these conditions are satisfied, mainly coma is well corrected over the entire zooming range, and the range of variation of aberrations is minimized at the strengthened refractive power of the second lens unit II up to the range given by the inequalities of condition (2).

If the upper limit of the inequalities of condition (4) or (5) is exceeded, inward coma increases objectionably. If one of their lower limits is exceeded, by contrast outward coma increases objectionably.

The other features of the invention which concern with the fourth lens unit are described below. These features are embodied in the first and second examples of the specific zoom lenses.

With the view to the configuration of FIG. 2 for the first lens unit I of positive power for focusing, the second or variator lens unit II of negative power whose path of motion is linear, the third or compensator lens unit III of positive power whose path of motion is convex toward the rear, and the fourth or image forming lens unit IV of positive power which remains stationary during zooming, in order to apply a better aberration correction technique, it is desired that the fourth lens unit IV is made constructed with five lens elements of positive-negative-negative-positive-positive powers in this order from the front. In other words, the fourth lens unit IV comprises, from front to rear, a 4-1st sub-unit having a positive refractive power followed by a 4-2nd sub-unit after a widest air separation among those in the fourth lens unit, the first positive-negative lenses being distributed to the 4-1st sub-unit, and the other negative-positive-positive lenses to the 4-2nd sub-unit.

Since, in the 4-1st sub-unit, the on-axial beam passes at a high position, the one positive lens and the one negative lens are arranged close to each other to thereby suppress production of spherical aberration. Another advantage is produced that on-axial coma is corrected in good balance. And, since the focal length of the 4-1st lens sub-unit, the focal length of the 4-2nd lens sub-unit and the separation between the 4-1st and 4-2nd lens sub-units largely affect the back focal distance, the use of the negative lens in each of the 4-1st sub-unit and the 4-2nd sub-unit and the widening of that separation to an appropriate value assure creation of the required back focal distance. It is in the 4-2nd sub-unit that the off-axial beam passes at a high position. From this reason, use is made of the one negative lens and the two positive lenses. Thus, the suppression is laid on production of distortion. Another advantage is that curvature of field is also corrected well. And, by arranging the negative lens and the positive lenses close to each other, off-axial coma and flare are corrected in good balance.

In another specific embodiment of the invention, the above-described 4-1st lens sub-unit has its first lens 4-11 formed with the front surface of stronger refractive power than that of the rear surface thereof, and its second lens 4-12 formed with both surfaces of concavity, and the above-described 4-2nd lens sub-unit has its first lens 4-21 formed to a negative meniscus shape of forward convexity, its second lens 4-22 formed with both surfaces of convexity, and its third lens 4-23 formed with the front surface of stronger refractive power than that of the rear surface thereof, the following conditions being satisfied:

$1.8 < R_{IV2}/R_{IV3} < 2.1$ (a)

$2.7 < |R_{IV3}/fw| < 3.3$ (b)

$0.03 < D_{IV2}/fw < 0.04$ (c)

$0.06 < D_{IV6}/fw < 0.09$ (d)

$1.5 < |R_{IV6}/fw| < 1.8$ (e)

$0.9 < R_{IV6}/R_{IV9} < 1.1$ (f)

where $R_{IVi}$ is the radius of curvature of the i-th lens surface counting from front in the above-described fourth lens unit, $D_{IVi}$ is the i-th lens thickness or air separation, and fw is the shortest focal length of the entire system.

When the features that the fourth lens unit is divided into two parts 4-1 and 4-2 by the widest air space, that these two sub-units both are made positive in power, and that the shape and thickness of the lenses constituting each sub-unit are figured by the above-defined inequalities are satisfied, an improved stability of good aberration correction is attained.

Next explanation is made about the technical significance of each of the above-cited inequalities of condition.

The inequalities of condition (a) give a range of the ratio of the radius of curvature of the rear surface of the 4-11th lens to that of the front surface of the 4-12th lens, or of the refractive power ratio of these surfaces. When this condition is satisfied, the spherical aberration produced from the rear surface of the 4-11th lens is well corrected by the front surface of the 4-12th lens. When the upper limit is exceeded, over-correction of the spherical aberration results. When the lower limit is exceeded, it becomes under-corrected.

The inequalities of condition (b) give a range of the refractive power of the front surface of the 4-12th lens, for mainly spherical aberration is well corrected. When the upper limit is exceeded, under-correction of spherical aberration results. When the lower limit is exceeded, it becomes over-corrected.

The inequalities of condition (c) give a range of the air separation between the 4-11th and 4-12th lenses, for mainly spherical aberration and coma are corrected in good balance. When the upper limit is exceeded, under-correction of spherical aberration results. When the lower limit is exceeded, coma is increased objectionably.

The inequalities of condition (d) give a range of the air separation between the 4-21st and 4-22nd lenses, for mainly coma is corrected. When the upper limit is exceeded, large inward coma is produced. When lower limit is exceeded, outward coma is increased objectionably.

The inequalities of condition (e) give a range of the negative refractive power of the rear surface of the 4-21st lens. When this condition is satisfied, a minimization of the bulk and size of the entire lens system can be achieved in such a way that mainly distortion is well corrected, and the back focal distance can be made sufficiently long. If the upper limit is exceeded, barrel distortion is produced on the wide angle side. When the lower limit is exceeded, the pincushion distortion is increased on the telephoto side, and the difficulty of securing the sufficiently long back focal distance is increased.

The inequalities of condition (f) give a range of the ratio of the radius of curvature of the rear surface of the 4-21st lens to that of the front surface of the 4-23rd lens, for the pincushion distortion produced from the rear surface of the 4-21st lens is well corrected by the front surface of the 4-23rd lens. When the upper limit is exceeded, the barrel distortion is increased on the wide angle side. When the lower limit is exceeded, the pincushion distortion is increased on the telephoto side. In either case, good correction of such aberration becomes more difficult to perform.

It is to be noted that in view of the reduction of the total length of the zoom lens and the improvement of the stability of aberration correction against zooming, the third lens unit III is preferably constructed in the form of a bi-convex singlet whose rear surface has a stronger refractive power than that of the front surface thereof.

Three examples of specific zoom lenses of the invention can be constructed in accordance with the numerical data given below for the radii of curvature, R, the axial thicknesses and air separations, D, and the refractive indices, N, and Abbe numbers, $v$, of the various lens elements with the subscripts numbered consecutively from front to rear.

The values of the factors of the above-cited inequalities of condition for these examples are listed in Table 1 and Table 2.

| Numerical Example 1 (FIGS. 3A to 3C) | | | |
|---|---|---|---|
| F = 1–2.85 | FNO = 1:1.45 | 2ω = 46.5°–17.2° | |
| R 1 = 6.712 | D 1 = 0.13 | N 1 = 1.80518 | $v$ 1 = 25.4 |
| R 2 = 2.880 | D 2 = 0.63 | N 2 = 1.51633 | $v$ 2 = 64.1 |

-continued

Figure 3A:
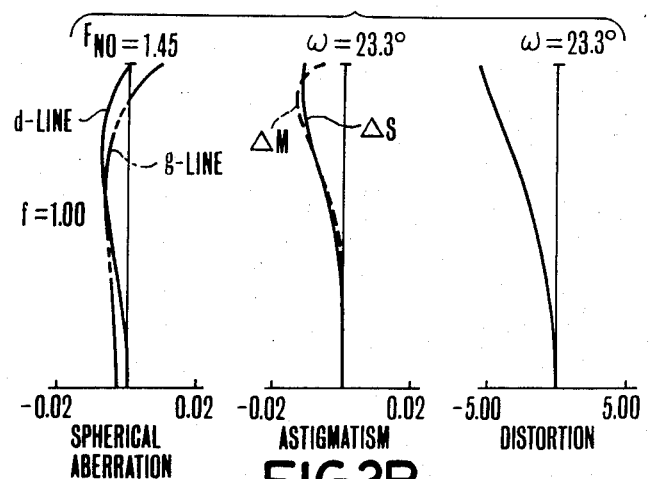
Figure 3B:
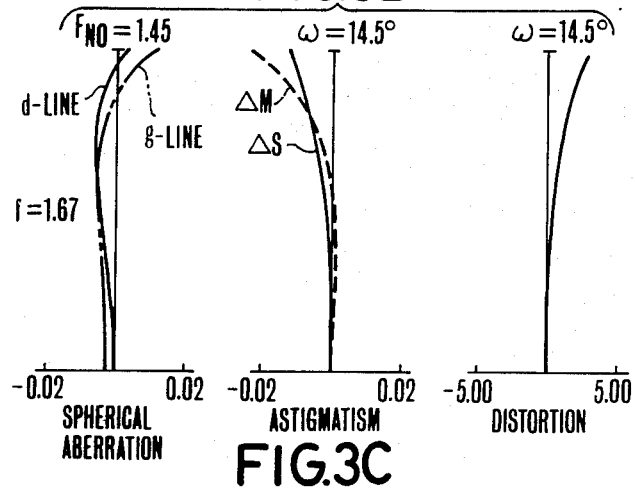
Figure 3C:
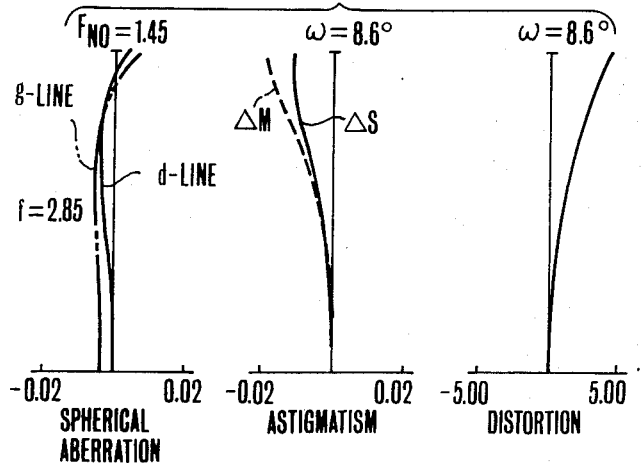

Numerical Example 1
(FIGS. 3A to 3C)

| F = 1-2.85 | FNO = 1:1.45 | 2ω = 46.5°-17.2° | |
|---|---|---|---|
| R 3 = −9.387 | D 3 = 0.02 | | |
| R 4 = 2.578 | D 4 = 0.41 | N 3 = 1.63854 | ν 3 = 55.4 |
| R 5 = 21.693 | D 5 = Variable | | |
| R 6 = −18.980 | D 6 = 0.11 | N 4 = 1.69680 | ν 4 = 55.5 |
| R 7 = 1.118 | D 7 = 0.25 | | |
| R 8 = −1.467 | D 8 = 0.09 | N 5 = 1.49831 | ν 5 = 65.0 |
| R 9 = 1.467 | D 9 = 0.19 | N 6 = 1.84666 | ν 6 = 23.9 |
| R10 = 5.221 | D10 = Variable | | |
| R11 = Stop | D11 = Variable | | |
| R12 = 7.470 | D12 = 0.18 | N 7 = 1.65844 | ν 7 = 50.9 |
| R13 = −3.255 | D13 = Variable | | |
| R14 = 1.437 | D14 = 0.31 | N 8 = 1.65844 | ν 8 = 50.9 |
| R15 = −5.882 | D15 = 0.03 | | |
| R16 = −2.948 | D16 = 0.11 | N 9 = 1.75520 | ν 9 = 27.5 |
| R17 = 3.417 | D17 = 0.72 | | |
| R18 = 7.464 | D18 = 0.11 | N10 = 1.80518 | ν 10 = 25.4 |
| R19 = 1.629 | D19 = 0.09 | | |
| R20 = 3.466 | D20 = 0.30 | N11 = 1.60311 | ν 11 = 60.7 |
| R21 = −2.293 | D21 = 0.02 | | |
| R22 = 1.550 | D22 = 0.33 | N12 = 1.69680 | ν 12 = 55.5 |
| R23 = −22.108 | D23 = 0.22 | | |
| R24 = ∞ | D24 = 0.59 | N13 = 1.51633 | ν 13 = 64.1 |
| R25 = ∞ | | | | b.f. = 1.16 (as measured with the parallel plate reduced to air)

| Lens Separations during Zooming | | | |
|---|---|---|---|
| | f | | |
| D | 1.00 | 1.67 | 2.85 |
| D 5 | 0.21 | 0.91 | 1.33 |
| D 10 | 0.40 | 0.71 | 0.28 |
| D 11 | 0.25 | 0.54 | 0.25 |
| D 13 | 0.38 | 0.09 | 0.38 |

| Lens Separations during Zooming | | | |
|---|---|---|---|
| | f | | |
| D | 1.00 | 1.67 | 2.85 |
| D 5 | 0.20 | 0.89 | 1.31 |
| D 10 | 1.63 | 0.93 | 0.51 |
| D 11 | 0.25 | 0.53 | 0.25 |
| D 13 | 0.38 | 0.09 | 0.38 |

Numerical Example 2
(FIGS. 4A to 4C)

| F = 1-2.85 | FNO = 1:1.45 | 2ω = 46.5°-17.2° | |
|---|---|---|---|
| R 1 = 7.615 | D 1 = 0.13 | N 1 = 1.80518 | ν 1 = 25.4 |
| R 2 = 3.188 | D 2 = 0.72 | N 2 = 1.51633 | ν 2 = 64.1 |
| R 3 = −8.099 | D 3 = 0.02 | | |
| R 4 = 2.541 | D 4 = 0.46 | N 3 = 1.63854 | ν 3 = 55.4 |
| R 5 = 14.562 | D 5 = Variable | | |
| R 6 = −25.618 | D 6 = 0.11 | N 4 = 1.69680 | ν 4 = 55.5 |
| R 7 = 1.204 | D 7 = 0.28 | | |
| R 8 = −1.520 | D 8 = 0.09 | N 5 = 1.49831 | ν 5 = 65.0 |
| R 9 = 1.520 | D 9 = 0.19 | N 6 = 1.84666 | ν 6 = 23.9 |
| R10 = 4.081 | D10 = Variable | | |
| R11 = Stop | D11 = Variable | | |
| R12 = 7.405 | D12 = 0.19 | N 7 = 1.65844 | ν 7 = 50.9 |
| R13 = −3.567 | D13 = Variable | | |
| R14 = 1.529 | D14 = 0.32 | N 8 = 1.65844 | ν 8 = 50.9 |
| R15 = −6.052 | D15 = 0.03 | | |
| R16 = −3.108 | D16 = 0.11 | N 9 = 1.75520 | ν 9 = 27.5 |
| R17 = 5.376 | D17 = 0.72 | | |
| R18 = 13.951 | D18 = 0.11 | N10 = 1.80518 | ν 10 = 25.4 |
| R19 = 1.582 | D19 = 0.07 | | |
| R20 = 2.914 | D20 = 0.29 | N11 = 1.60311 | ν 11 = 60.7 |
| R21 = −2.451 | D21 = 0.02 | | |
| R22 = 1.650 | D22 = 0.30 | N12 = 1.71300 | ν 12 = 53.8 |
| R23 = −24.491 | D23 = 0.22 | | |
| R24 = ∞ | D24 = 0.59 | N13 = 1.51633 | ν 13 = 64.1 |
| R25 = ∞ | | | | b.f. = 1.17 (as measured with the parallel plate reduced to air)

Figure 5A:
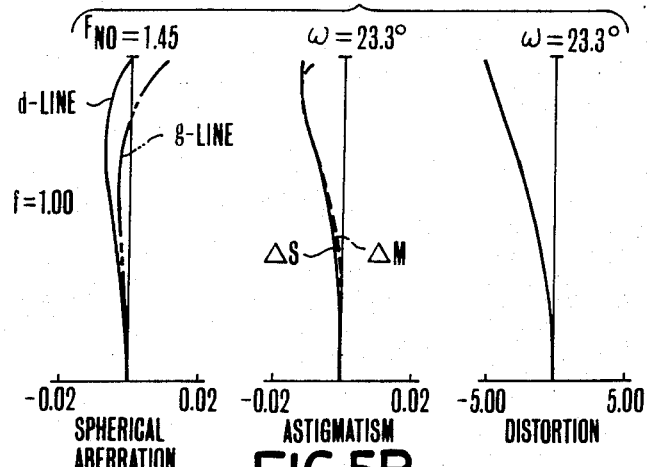
Figure 5B:
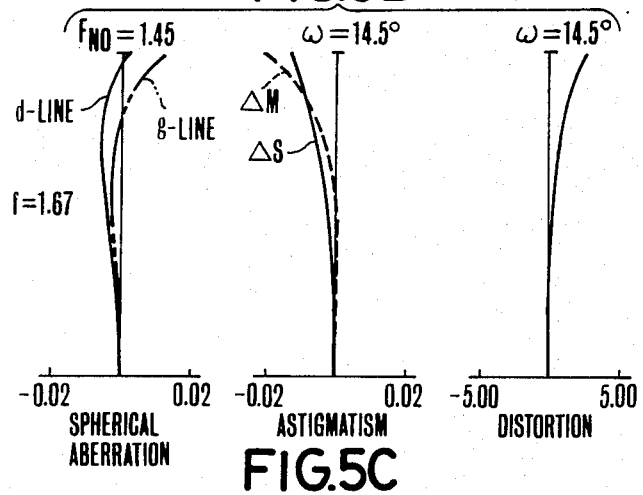
Figure 5C:
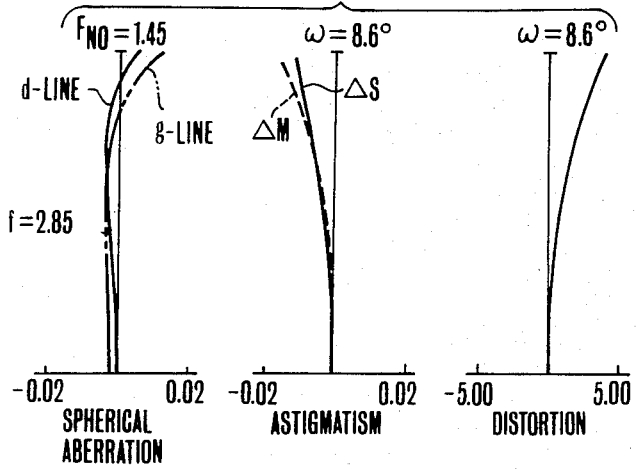

Numerical Example 3
(FIGS. 5A to 5C)

| F = 1-2.85 | FNO = 1:1.45 | 2ω = 46.5°-17.2° | |
|---|---|---|---|
| R 1 = 7.375 | D 1 = 0.15 | N 1 = 1.80513 | ν 1 = 25.4 |

-continued

Numerical Example 3
(FIGS. 5A to 5C)

| F = 1–2.85 | FNO = 1:1.45 | | 2ω = 46.5°–17.2° | |
|---|---|---|---|---|
| R 2 = 3.441 | D 2 = 0.71 | N 2 = 1.51633 | ν 2 = 64.1 |
| R 3 = −10.836 | D 3 = 0.02 | | |
| R 4 = 2.999 | D 4 = 0.45 | N 3 = 1.63854 | ν 3 = 55.4 |
| R 5 = 19.212 | D 5 = Variable | | |
| R 6 = −32.391 | D 6 = 0.11 | N 4 = 1.69680 | ν 4 = 55.5 |
| R 7 = 1.295 | D 7 = 0.28 | | |
| R 8 = −1.718 | D 8 = 0.09 | N 5 = 1.49831 | ν 5 = 65.0 |
| R 9 = 1.718 | D 9 = 0.17 | N 6 = 1.84666 | ν 6 = 23.9 |
| R10 = 5.535 | D10 = Variable | | |
| R11 = Stop | D11 = Variable | | |
| R12 = 10.772 | D12 = 0.19 | N 7 = 1.65844 | ν 7 = 50.9 |
| R13 = −3.837 | D13 = Variable | | |
| R14 = 1.452 | D14 = 0.35 | N 8 = 1.65844 | ν 8 = 50.9 |
| R15 = −5.790 | D15 = 0.03 | | |
| R16 = −3.020 | D16 = 0.11 | N 9 = 1.75520 | ν 9 = 27.5 |
| R17 = 3.438 | D17 = 0.69 | | |
| R18 = 6.897 | D18 = 0.11 | N10 = 1.80518 | ν 10 = 25.4 |
| R19 = 1.644 | D19 = 0.10 | | |
| R20 = 3.885 | D20 = 0.33 | N11 = 1.60311 | ν 11 = 60.7 |
| R21 = −2.325 | D21 = 0.02 | | |
| R22 = 1.544 | D22 = 0.39 | N12 = 1.69680 | ν 12 = 55.5 |
| R23 = −24.622 | D23 = 0.22 | | |
| R24 = ∞ | D24 = 0.59 | N13 = 1.51633 | ν 13 = 64.1 |
| R25 = ∞ | | | | b.f. = 1.18 (as measured with the parallel plate reduced to air)

Lens Separations during Zooming

| D | f | | |
|---|---|---|---|
|  | 1.00 | 1.67 | 2.86 |
| D 5 | 0.25 | 0.06 | 1.55 |
| D 10 | 1.69 | 0.88 | 0.39 |
| D 11 | 0.34 | 0.68 | 0.34 |
| D 13 | 0.38 | 0.04 | 0.38 |

TABLE 1

The values of the factors in the first five
of the various conditions of the invention
for all the numerical examples

| | | Numerical Example | | |
|---|---|---|---|---|
| Inequalities | Factor | 1 | 2 | 3 |
| (1) | $f_1/f_w$ | 3.434 | 3.488 | 3.986 |
| (2) | $f_2/f_w$ | −1.022 | −1.022 | −1.183 |
| (3) | $R_{III1}/f_w$ | 6.712 | 7.615 | 7.375 |
| (4) | $R_{II2}/f_w$ | 1.118 | 1.204 | 1.295 |
| (5) | $D_{II2}/f_w$ | 0.25 | 0.28 | 0.28 |

TABLE 2

The values of the factors in the last six of
the various conditions of the invention for
the first two numerical examples

| | | Numerical Example | |
|---|---|---|---|
| Inequalities | Factor | 1 | 2 |
| (a) | $R_{IV2}/R_{IV3}$ | 1.995 | 1.947 |
| (b) | $|R_{IV3}/f_w|$ | 2.948 | 3.108 |
| (c) | $D_{IV2}/f_w$ | 0.03 | 0.03 |
| (d) | $D_{IV6}/f_w$ | 0.09 | 0.07 |
| (e) | $|R_{IV6}/f_w|$ | 1.629 | 1.582 |
| (f) | $R_{IV6}/R_{IV9}$ | 1.051 | 0.959 |

According to the present invention, by shortening the total length of the entire lens system and the diameter of the first lens unit to achieve a great reduction of the overall weight, a high range compact zoom lens of reduced F-number can be realized.

Also, despite the maximum image angle is increased, the height of incidence of the oblique pencil on the first lens unit on the wide angle side can be made relatively low. This enables the diameter of the first lens unit to be prevented from increasing. Further, since the third and fourth lens units are made to take their places behind the stop, because their effective diameters are not very increased, a wide angle zoom lens can be easily realized, while still preserving its bulk and size at the minimum.

What is claimed is:

1. A compact zoom lens comprising, from front to rear, a first lens unit for focusing having a positive refractive power, a second lens unit having a negative refractive power and axially movable for varying the image magnification, a third lens unit axially movable for compensating for the shift of an image plane resulting from the variation of the image magnification, and a fourth lens unit of positive refractive power having an image forming function which remains stationary relative to a focal plane, said fourth lens unit including, from front to rear, a first lens of positive refractive power with a front surface of stronger refractive power than a rear surface thereof, a second lens of negative refractive power with front and rear lens surfaces that are concave, a third lens of negative refractive power having a meniscus shape convex towards the front, a fourth lens of positive refractive power with front and rear surfaces that are convex and a fifth lens of positive power with a front surface of stronger refractive power than a rear surface thereof.

2. A zoom lens according to claim 1, satisfying the following conditions:

$$1.8 < R_{IV2}/R_{IV3} < 2.1$$

$$2.7 < |R_{IV3}/f_w| < 3.3$$

$$0.03 < D_{IV2}/f_w < 0.04$$

$$0.06 < D_{IV6}/f_w < 0.09$$

$$1.5 < |R_{IV6}/f_w| < 1.8$$

$$0.9 < R_{IV6}/R_{IV9} < 1.1$$

where $R_{IVi}$ is the radius of curvature of the i-th lens surface counting from front in said fourth lens unit, $D_{IVi}$ is the i-th lens thickness or air separation counting from front in said fourth lens unit, and fw is the shortest focal length of the entire lens system.

3. A zoom lens according to claim 1, further comprising a stop for determining an F-number arranged in a space between said second and said third lens units to remain axially stationary during zooming.

4. A compact zoom lens comprising, from front to rear, a first lens unit for focusing of positive refractive power, a second lens unit of negative refractive power movable monotonously when varying the image magnification, a third lens unit of positive refractive power movable so as to have a convex locus toward the image side to maintain constant the position of an image plane which shifts as the image magnification varies, a fourth lens unit of positive refractive power having an image forming function and arranged to remain stationary during zooming, and an axially fixed stop positioned in a space between said second and said third lens units, said zoom lens satisfying the following conditions:

$$3.1 < f_1/fw < 4.19$$

$$-1.24 < f_2/fw < -0.97$$

where $f_1$ and $f_2$ are the focal lengths of said first and said second lens units respectively, and fw is the shortest focal length of the entire lens system.

5. A compact zoom lens according to claim 4 further satisfying the following conditions:

$$6.37 < R_{I1}/fw < 8$$

$$1.06 < R_{I2}/fw < 1.36$$

$$0.23 < D_{I2}/fw < 0.3$$

where $R_{Ii}$ is the radius of curvature of the i-th lens surface counting from front in said first lens unit, $R_{IIi}$ is the radius of curvature of the i-th lens surface counting from front in said second lens unit, and $D_{IIi}$ is the i-th lens thickness or air separation counting from front in said second lens unit.

6. A zoom lens comprising, from front to rear, a first lens unit for focusing, having a positive refractive power and consisting of a cemented lens of a negative meniscus lens having a strong concave surface on the image side and a bi-convex lens, and a meniscus lens having a convex surface on the object side; a second lens unit having a negative refractive power and movable along the optical axis for zooming, and consisting of a negative lens having a strong concave surface on the image side and a cemented lens of a bi-concave lens and a positive meniscus lens concave toward an image; a third lens unit axially movable for compensating for the shift of an image plane resulting from the variation of the image magnification; and a fourth lens unit of positive refractive power having an image forming function which remains stationary relative to a focal plane, said fourth lens unit including, from front to rear, a first lens of positive refractive power, a second lens of negative refractive power, a third lens of negative refractive power, a fourth lens of positive refractive power and a fifth lens of positive refractive power.

7. A compact zoom lens according to claim 6, wherein
said first lens has a front surface of stronger refractive power than a rear surface thereof,
said second lens has front and rear lens surfaces that are concave,
said third lens is of meniscus shape convex toward front,
said fourth lens has front and rear lens surfaces that are convex, and
said fifth lens has a front surface of stronger refractive power than a rear surface thereof.

8. A zoom lens according to claim 7, satisfying the following conditions:

$$1.8 < R_{IV2}/R_{IV3} < 2.1$$

$$2.7 < |R_{IV3}/fw| < 3.3$$

$$0.03 < D_{IV2}/fw < 0.04$$

$$0.06 < D_{IV6}/fw < 0.09$$

$$1.5 < |R_{IV6}/fw| < 1.8$$

$$0.9 < R_{IV6}/R_{IV9} < 1.1$$

where $R_{IVi}$ is the radius of curvature of the i-th lens surface counting from the front in said fourth lens unit, $D_{IVi}$ is the i-th lens thickness or air separation counting from the front in said fourth lens unit, and fw is the shortest focal length of the entire lens system.

9. A zoom lens according to claim 6, further comprising a stop for determining an F-number arranged in a space between said second and said third lens units to remain axially stationary during zooming.

* * * * *

UNITED STATES PATENT AND TRADEMARK OFFICE
CERTIFICATE OF CORRECTION

PATENT NO. : 4,854,684
DATED : August 8, 1989
INVENTOR(S) : AKIHISA HORIUCHI

It is certified that error appears in the above-identified patent and that said Letters Patent is hereby corrected as shown below:

At column 1, line 40, "focusing" should read --focusing,--; and

At column 1, line 66, "Serial No. 391,537" should read --Serial No. 931,537--.

At column 2, line 26, "AS" should read --$\Delta S$--.

At column 7, line 32, "D10 0.40" should read --D10 1.40--.

Column 11
At claim 1, line 50, "having" should read --with--; and

At claim 1, line 53, "power" (first occurrence) should read --refractive power--.

At claim 2, line 2, "from front" should read --from the front--; and

At claim 2, line 4, "from front" should read --from the front--.

At claim 5, line 31, "claim 4" should read --claim 4,--;

UNITED STATES PATENT AND TRADEMARK OFFICE
CERTIFICATE OF CORRECTION

PATENT NO. : 4,854,684

DATED : August 8, 1989

INVENTOR(S) : AKIHISA HORIUCHI

It is certified that error appears in the above-identified patent and that said Letters Patent is hereby corrected as shown below:

Column 11

At claim 5, line 40, "from front" should read --from the front--;

At claim 5, line 42, "from front" should read --from the front--; and

At claim 5, line 43, "from front" should read --from the front--.

Signed and Sealed this

Tenth Day of July, 1990

Attest:

HARRY F. MANBECK, JR.

Attesting Officer

Commissioner of Patents and Trademarks